United States Patent [19]

Kline

[11] 4,203,003
[45] May 13, 1980

[54] FRAME SEARCH CONTROL FOR DIGITAL TRANSMISSION SYSTEM

[75] Inventor: Ralph L. Kline, Los Altos, Calif.

[73] Assignee: GTE Automatic Electric Laboratories Incorporated, Northlake, Ill.

[21] Appl. No.: 965,975

[22] Filed: Dec. 4, 1978

[51] Int. Cl.² ............................................. H04L 7/00
[52] U.S. Cl. ................................... 455/111; 455/118
[58] Field of Search .................. 340/146.1 D, 147 SY; 178/69.1, 53; 328/72, 74, 155; 179/15 BS, 15 AF

[56] References Cited

U.S. PATENT DOCUMENTS

| | | | |
|---|---|---|---|
| 4,002,845 | 1/1977 | Kaul et al. | 179/15 BS |
| 4,086,437 | 4/1978 | Henrion et al. | 179/15 BS |

Primary Examiner—Benedict V. Safourek
Attorney, Agent, or Firm—Leonard R. Cool

[57] ABSTRACT

A frame search control circuit for a digital transmission system includes an eight bit preview store and a four stage counter. At the beginning of each frame a timing device causes the eight stored bits to be sequentially read out into a comparator for a comparison with bits from the incoming bit stream. The incoming bits are stored in the preview store simultaneously with the read out to the comparator. For an in-frame condition only the first comparison is important and the remaining comparisons are ignored. Further, a count of eight is loaded into the four stage counter which limits the count to eight allowing only eight bits from the incoming bit stream to be read into the preview store, the framing bit being read in first so as to be available for comparison at the next framing interval. For an out-of-frame condition, the timing device initiates the sequential comparison beginning with the framing interval and in this case, each comparison is important. Further, a count of eight is not loaded into the four stage counter. The counter begins counting from 1111 and, if a correct comparison occurs during any of the first eight counts, a load function is enabled. This causes a count of eight, 1000, to be immediately loaded into the counter. Also, for each count which is less than eight, a control signal is enabled which inhibits the framing clock for one time slot for each such count. Thus, the position of the frame interval is shifted so as to appear in the proper time slot once an in-frame condition is obtained. If a correct comparison is not obtained during the first eight counts, the control signal changes state allowing the framing clock to run and the next eight incoming bits are shifted into the preview store. In succeeding frames the process will be repeated until an in-frame condition is obtained.

6 Claims, 2 Drawing Figures

_Fig._ 1

Table I

| COUNT | QD | QC | QB | QA | CY | C̄Y | QD ⊕ C̄Y |
|---|---|---|---|---|---|---|---|
| 15 | 1 | 1 | 1 | 1 | 1 | 0 | 1 |
| 0 | 0 | 0 | 0 | 0 | 0 | 1 | 1 |
| 1 | 0 | 0 | 0 | 1 | 0 | 1 | 1 |
| 2 | 0 | 0 | 1 | 0 | 0 | 1 | 1 |
| 3 | 0 | 0 | 1 | 1 | 0 | 1 | 1 |
| 4 | 0 | 1 | 0 | 0 | 0 | 1 | 1 |
| 5 | 0 | 1 | 0 | 1 | 0 | 1 | 1 |
| 6 | 0 | 1 | 1 | 0 | 0 | 1 | 1 |
| 7 | 0 | 1 | 1 | 1 | 0 | 1 | 1 |
| 8 | 1 | 0 | 0 | 0 | 0 | 1 | 0 |
| 9 | 1 | 0 | 0 | 1 | 0 | 1 | 0 |
| 10 | 1 | 0 | 1 | 0 | 0 | 1 | 0 |
| 11 | 1 | 0 | 1 | 1 | 0 | 1 | 0 |
| 12 | 1 | 1 | 0 | 0 | 0 | 1 | 0 |
| 13 | 1 | 1 | 0 | 1 | 0 | 1 | 0 |
| 14 | 1 | 1 | 1 | 0 | 0 | 1 | 0 |
| 15 | 1 | 1 | 1 | 1 | 1 | 0 | 1 |

FRAME SEARCH CONTROL FOR DIGITAL TRANSMISSION SYSTEM

BACKGROUND OF THE INVENTION

1. Field of the Invention

This invention relates to framing synchronization in digital transmission systems and, in particular, to a novel technique of frame search control which allows a comparison of up to n bits on the occurrence of each framing clock pulse while an out-of-frame condition exists, and stores the next n sequential bits for subsequent comparison. Thus a fast reframe time is obtained with a minimum of circuit elements.

2. Description of the Prior Art

In some systems, which have addressed the problem of reframing upon loss of synchronization, the framing clock can be inhibited for one bit interval. A frame generator is also employed which provides the 10 or 01 alternating binary conditions associated with a winking frame signal. In certain systems a preview circuit is used. The preview circuit stores, during an out-of-frame condition, the bit immediately following that in the current framing interval. The preview bit is used during cycles where the frame clock is inhibited to preset the framing generator states so that a correct framing indication will be anticipated in the next framing bit interval. Circuitry is included to inhibit the framing clock one bit interval for each frame in which an error in the frame pattern is detected and to insure that in these cases the state of the framing generator is set in accordance with the state of the preview bit.

A framing system which employs an eight bit store and a frame control is described in U.S. Pat. No. 3,742,139, entitled "Framing System for T-Carrier Telephony", inventor M. A. Baehly. A group of eight bits are arbitrarily selected in a first frame and are fed to the store and compared with the corresponding time slots two frames later. Thus, the eight bits of the first frame are compared with the bits in the same time slot of the third frame, the third frame with the fifth, the fifth with the seventh and the seventh with the ninth, in each case with corresponding time slots. If framing is not achieved after the comparison between the seventh and ninth frames, the frame control circuit 18 operates to delay the opening of the store 16 by eight time slots, and another series of comparisons is carried out, this time directed to the series of eight time slots immediately following the eight time slots in the first comparison. The process is repeated until framing is achieved.

Disadvantages of the prior art system are the circuit complexity and the necessity to wait through four comparisons before the frame shifting is initiated. These as well as other disadvantages have been overcome as will be evident when the operation of subject framing search control is understood.

SUMMARY OF THE INVENTION

In a receiver for recovering digital information from an incoming serial bit stream containing informations bits and framing bits, and having a bit clock, and an error density detector, a frame search control includes a framing clock, which may be disabled by an inhibit input, is driven by the bit clock and provides at a framing bit interval a framing bit clock output. A register sequentially stores n successive bits from the incoming bit stream, which are clocked into the register by a series of n clock pulses at the bit rate following a framing bit interval when an in-frame condition exists. The output of the register's last stage being used for sequential comparison of the register's contents will, when clocked, read out stored bits while new bits are being stored. A comparator provides an error indication whenever a framing error occurs as by a comparison of the stored bits and the bits in the incoming bit stream. The occurrence of a predetermined number of errors during a specified time interval causes said error density detector to change the state and, thus, provide an out-of-frame indication at its output terminal. A counter controls the gating of pulses to the register. The counting sequence is responsive to the comparator output and the state of the signal at the output terminal of said error density detector so as to gate n bit clock pulses when an in-frame condition exists and to increase the number of bit clock pulses by up to a predetermined number greater than n when successive comparisons indicate that both an error and an out-of-frame condition exist.

DETAILED DESCRIPTION OF THE INVENTION

Figure 1:
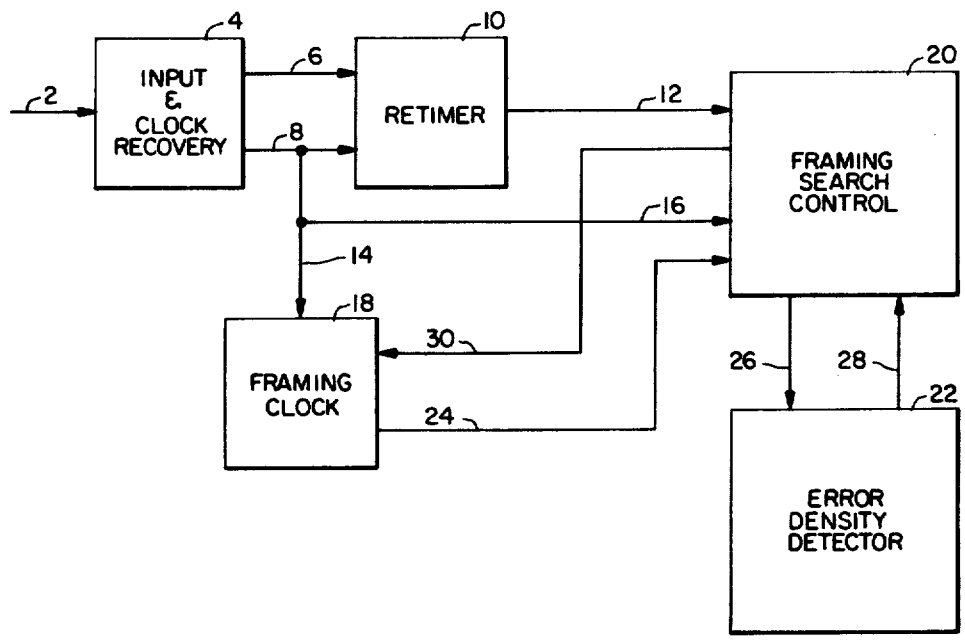
FIG. 1 is a block diagram illustrating the relationship of frame search control 20 with the retimed bit stream, recovered bit clock, the framing clock and error density detector.

Referring now to FIG. 1, an incoming serial bit stream, including the alternating framing bits, is applied via path 2 to input and clock recovery 4. Input and clock recovery 4 accepts the serial bit stream, derives the bit clock by well known techniques and conditions the serial bit stream for retiming in retimer 10. While retiming is desirable it is not an element of the frame search control of the invention. The bit clock output appears on path 8 where it is applied directly as one input of retimer 10, and, from path 8 to paths 14 and 16, the bit clock is applied to an input, respectively, of the framing clock 18 and frame search control 20. The serial bit stream is retimed by the recovered bit clock in retimer 10. If the normal PCM bipolar format is used, input and clock recovery 4 converts the RZ bipolar signal into a unipolar NRZ signal which is then transmitted over path 6 to retiming circuit 10. Framing clock 18 provides a framing clock pulse at the framing bit interval along path 24 which is applied to frame search control 20. Another input to frame search control 20 is applied along path 28 from the error density detector 22 to provide the in-frame or out-of-frame indication to control 20. The output along path 26 is the comparison of the stored framing bit with the retimed bit stream which is used by the error density detector 22 only during the first comparison for each framing bit interval. Also, as will be more clearly explained hereinafter, under specific conditions an inhibit signal is applied along path 30 to divider 18.

Figure 2:
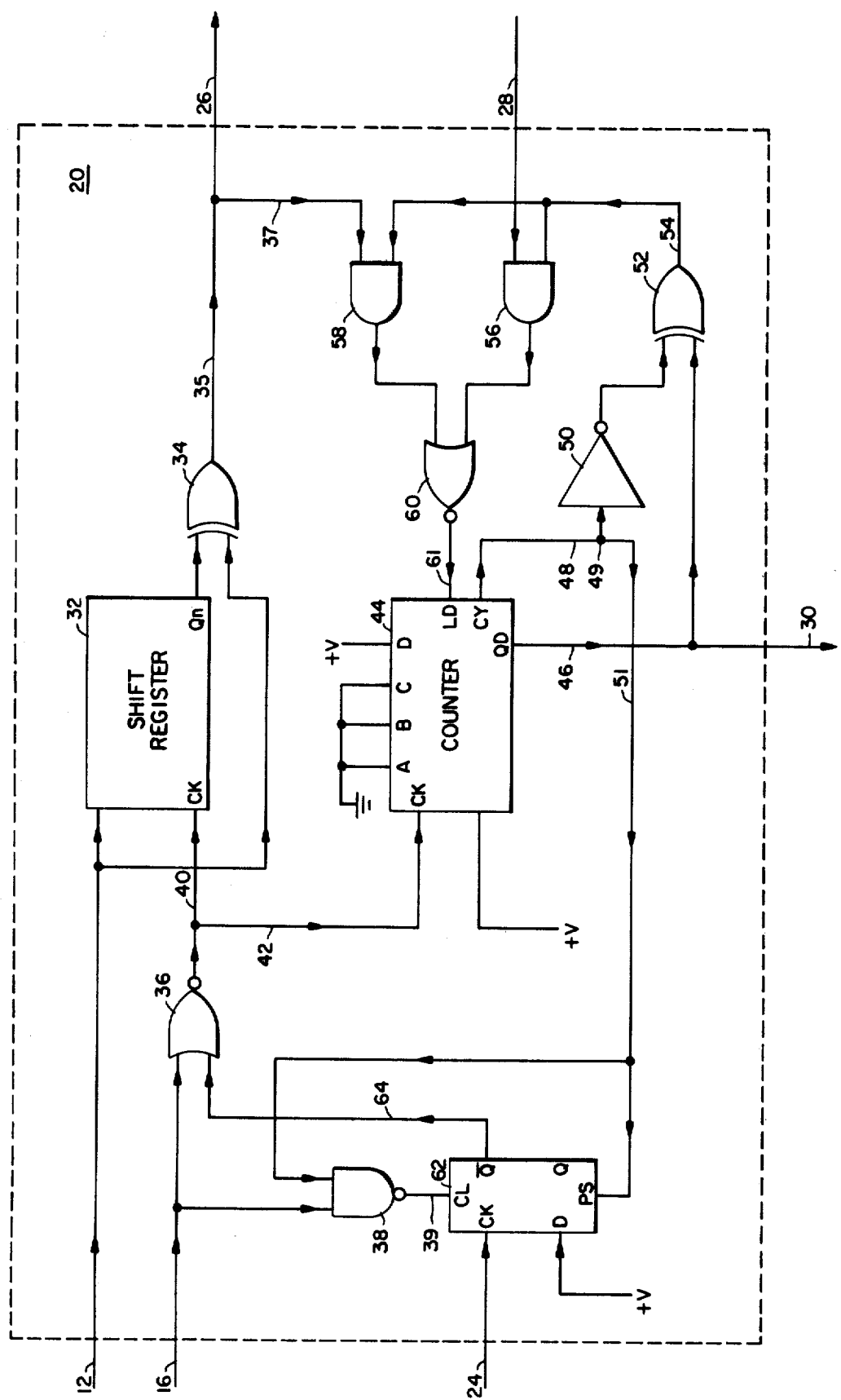
FIG. 2 is a schematic logic circuit diagram showing the preferred embodiment of the frame search control 20.

The operation of framing search control 20 and its inter-relation with the retimed bit stream, bit clock, framing clock and error density detector will now be explained. First the operation during an in-frame condition will be explained and then the operation of the frame search control circuitry under an out-of-frame condition will be described. Referring now to FIG. 2 it may be seen that the retimed bit stream along path 12 is applied to an input of shift register 32, and one input to Exclusive-OR gate 34. While counter 44 can have any number of stages m and register 32 than has $n=2^{m-1}$ stages, for purposes of our discussion and as a practical example, counter 44 has m=4 stages and shift register 32 will be considered to have the capability of storing $2^{m-1}=2^3=8$ bits. Further, it will be assumed that register 32 is loaded and the framing bit is at output $Q_n$ (last position) which is applied to the second input of Exclusive-OR gate 34. Thus, the bit in the $Q_n$ position of shift register 32 is applied to one input of Exclusive-OR gate 34 and is compared with the incoming bits on path 12. Exclusive-OR gate 34 provides a binary "1" output on path 35 when a correct comparison is made, i.e., the inputs are of opposite states. Conversely, when the compared bits are of a like state at the input of gate 34 the output is a binary "0", which is indicative of an error. As far as the error density detector 22 is concerned, only the incorrect comparisons which occur at the framing interval of framing clock 18 are considered to be errors.

Counter 44 is a four-stage counter which may have the count loaded in from load inputs A, B, C, D when the load enable function LD is enabled. The four-stage counter has 16 states as shown in Table 1 and it is assumed that initially the counter is at a full count of 15 in binary 1111. Thus the $Q_D$ output of counter 44 is a binary "1" which is applied via path 46 to one input of Exclusive-OR gate 52 and via path 30 to framing clock 18 which allows the framing clock to operate normally. Also the carry output CY is a binary "1". The CY output is applied via path 48 and junction 49 to inverter 50 and the inverted output is applied as a second input to Exclusive-OR gate 52 which provides under these conditions a binary "1" output on path 54 which is connected to one input of both AND-gates 56 and 58. The carry output is also applied along path 51 to one input of NAND-gate 38. The binary "1" enables gate 38 so that a binary "0" occurs on the next clock pulse and is applied along path 39 to the clear input of D-type flip-flop 62. This resets flip-flop 62 and provides a binary "1" output at $\overline{Q}$ along path 64 to one input of NOR-gate 36. This disables NOR-gate 36 so that clock pulses from the bit clock on path 16 do not pass through to path 40. Thus, the bits previously read into shift register 32 are stored, and the count in counter 44 is fixed.

At the next framing interval framing clock 18 will produce a rising edge on path 24 to cause the +V applied to the D input of flip-flop 62 to be read into the flip-flop causing $\overline{Q}$ to become a binary "0" which enables NOR-gate 36 and allows the bit clock pulses on path 16 to be applied via paths 40 and 42 respectively to shift register 32 and counter 44. The bit clock is timed with respect to the bits appearing in the bit stream on path 12 such that the rising edge of the clock pulse on paths 40 and 42 appear at approximately the center of the retimed bits. Thus, the comparison of the retimed bit with the bit stored at $Q_n$ occurs prior to the first clock pulse output passed by NOR-gate 36 after NOR-gate 36 is enabled. If the error density detector 22 indicates that an in-frame condition exists a binary "1" on path 28 and the binary "1" on path 54 will cause the and/or invert (AOI) circuit consisting of AND-gates 56 and 58 and NOR-gate 60 to provide a binary "0" on path 61 which enables the loading function LD of counter 44. Thus, on the first clock pulse of the frame bit interval, the binary count 1000 at the load input (D, C, B and A) to counter 44 will be loaded into the counter. This sets the counter to a count of 8 as illustrated in Table 1. The carry output Cy on path 48, junction 49 changes to a binary "0" and remains in this state until the carry output returns to a binary "1". As noted in Table 1 this would occur eight counts later when a full count 1111 has been produced by counter 44. Therefore, NOR-gate 36 is enabled for eight counts which enables shift register 32 for this period. The bit in the framing bit position, and the 7 subsequent bits are written into the register 32. During this 8 bit interval the binary "0" on path 54 forces the AOI gate to disable the LD input to counter 44. As previously noted when the carry output goes to binary "1", NAND-gate 38 is enabled causing flip-flop 62 to change state and thus disable NOR-gate 36, effectively blocking the bit clock pulses on path 16 from paths 40 and 42. So long as the system remains in-frame the operation of frame control arrangement 20 is as above described. However, when the number of framing errors exceeds a predetermined ratio, the output of the error density detector 22 changes state becoming a binary "0", which is applied on path 28 to one input of AND-gate 56 causing its output to become a binary "0". At the next framing bit interval if Exclusive-OR gate 34 provides an error indication, a binary "0" is applied via paths 35 and 37 to one input of AND-gate 58. This causes a binary "0" output from AND-gate 58. Thus, the AOI output is a binary "1" on path 61 which disables the load function, LD input, of counter 44 so that on the first clock pulse the count is changed from a full binary count of 1111 to a count of 0000.

Up until this time it is to be noted that the $Q_D$ output on path 30 has been binary "1". The effect of the $Q_D$ output going to binary "0" is to inhibit the framing clock 18 for one bit interval for each bit period that $Q_D$ remains "0". Since the carry output of counter 44 is also binary "0" NOR-gate 36 will remain enabled allowing the bit clock pulses to pass through and onto paths 40 and 42. Shift register 32 shifts the 8 stored bits as the new bits are entered and thus provides a new bit, following each clock pulse, for a comparison in Exclusive-OR gate 34 with bits in the incoming bit stream. If no correct comparison is made counter 44 will count to eight at which point $Q_D$ becomes binary "1" and ceases to inhibit framing clock 18. The counter will then count to a full count during which time an additional 8 bits are stored in shift register 32 before the NOR-gate 36 becomes disabled as previously described. However, if during this eight bit frame search period a correct comparison is obtained with the incoming bit stream and the previously stored preview bits, a binary "1" input is applied via paths 35 and 37 to one input of AND-gate 58. Then at the same time a binary "1" input is applied via path 54 to the other input of AND-gate 58, and gate 58 provides a binary "1" at its output. Thus, the AOI circuit has a binary "0" output on path 61 which enables the load function, LD, and reads in the eighth count, i.e., 1000, so that the $Q_D$ output immediately becomes binary "1", prior to a normal eight count and removes the inhibit signal from path 30 and framing clock circuit 18. The compared bit of the incoming bit stream is then shifted into register 32 so that it appears at the eighth position, i.e., $Q_n$, so as to be available for comparison with the next framing bit on the next framing interval. Thus it is seen that during an out-of-frame condition a preview store (shift register 32) of n bits may be compared with the incoming bit stream at each frame interval until a correct comparison is obtained.

While the invention has been shown and described with reference to a preferred embodiment thereof, it will be understood by those skilled in the art that changes in form and detail may be made therein without departing from the spirit and scope of the invention. For example, it would not be necessary to employ alternating framing bits although these are most commonly used. If the bits did not alternate the method of comparison would necessarily be changed. A different logic arrangement could be substituted for the and-or-invert (AOI) circuit.

What is claimed is:

1. In a receiver for recovering digital information from an incoming serial bit stream containing information bits and framing bits, and including a bit clock synchronized with the bit rate of the bit stream and an error density detector, a frame search control which comprises;

a framing clock having an output terminal and an inhibit input terminal, and providing at a framing interval a pulse at said output terminal;

means for sequentially storing n bits from the incoming bit stream, having a first input terminal arranged to accept the digital information from said bit stream, a second input terminal and an output terminal;

a timing arrangement providing at an output terminal a series of n clock pulses at the bit rate following a framing interval when an in-frame condition exists said output terminal being connected to the second input terminal of said storing means whereby bits stored during the preceeding frame are read out and new bits are written in during the present frame;

a comparator having one input connected to the output of said storing means, having a second input connected to receive said bit stream, said comparator providing an error indication for each violation of the framing pattern, said error indication being applied to said error density detector so as to change the state of the output when an out-of-frame indication occurs, i.e., when the number of error indications at the framing interval exceeds a predetermined ratio; and means for limiting the number of pulses in said series of clock pulses, said limiting means having an input connected to the output of said timing arrangement and being responsive to the comparator output and the state of the error density detector so as to provide a count of n when an in-frame condition exists and to increase the count by up to a predetermined number greater than n when both an error indication and an out-of-frame indication occur.

2. A frame search control in accordance with claim 1 wherein said means for limiting further comprises:

counting means for counting the number of clock pulses, having a clock input connected to the output of said timing arrangement having programmed inputs under control of a load function terminal providing a first control signal at a first output, said first control signal having one binary state for clock pulse counts less than the n and the other binary state otherwise, and a second control signal at a second output, said second control signal having said one binary state for clock pulse counts less than a full count and the other binary state when a full count of 2n is reached;

a first logic means having one input connected to the first output of said counting means, having a second input connected to the second output of said counting means, said first logic means providing at an output a binary value of one state when the first and second control signals are of the same state and of the other binary state otherwise; and second logic means having a first input connected to the output of said first logic means, having a second input connected to the output of said comparator and having a third input connected to the output of said error density detector, and having an output, said second logic means providing a load enable signal to the load function terminal of said counting means except when an error indication and an out-of-frame indication concur or the first and second control signals are in opposite states so that under an in-frame condition said counting means will cause said second control signal to change state when a count of n has been attained, and under an out-of-frame condition the load function input will be inhibited causing said counting means to count from a 0 count until either a correct comparison is made, thereby changing the state of the comparator output, or a count of 2n is obtained so as to permit a series of n additional clock pulses to occur and thus read into said storing means the next n bits from said bit stream.

3. A frame search control in accordance with claim 2 wherein said counting means further comprises:

an m stage counter where $2^{m-1} = n$, having a count of m/2 (binary 100---0) connected to the programmed inputs to be read in immediately following the framing interval if the load function input is enabled, otherwise the count starts at zero, said first control signal is obtained from the output of the last counter stage, i.e., the most significant bit (MSB), and said second control signal is obtained from the carry output.

4. A frame search control in accordance with claim 3 wherein said first logic means further comprises:

an inverter having the input connected to the carry output of said m stage counter, and providing the opposite binary states at an output; and an Exclusive-OR gate having a first input connected to the output of the last stage of said counter, having a second input connected to the output of said inverter and having an output.

5. A frame search control in accordance with claims 3 or 4 wherein said second logic means further comprises:

a first AND-gate having a first input connected to the output of said first logic means, having a second input connected to the output of said error density detector, and having an output;

a second AND-gate having a first input connected to the output of said first logic means, having a second input connected to the output of said comparator, and having an output; and a NOR-gate having inputs connected to the outputs of said first and second AND-gates and having an output connected to the load function input of said counter.

6. A frame search control in accordance with claim 1, 2 or 5 wherein said timing arrangement further comprises:

an edge triggered flip-flop having a clock input connected to the pulse output of said framing clock, having a fixed binary state applied to the input, having a clear input and providing at the $\overline{Q}$ output an enable state on the occurrence of the framing clock pulse, and retaining the enable state output until a pulse appears at said clear input;

a NOR-gate having a first input connected to the $\overline{Q}$ output of said flip-flop, having a second input connected to receive said bit clock pulses, and providing at an output the series of bit clock pulses while said flip-flop is in the enable state; and a NAND-gate having a first input connected to receive the bit clock pulses, having a second input connected to the carry output of said counter, and having an output connected to the clear input of said flip-flop, whereby a clear pulse is applied to said clear input to put the flip-flop in the disable state when the counter reaches a full count.

* * * * *